(12) United States Patent
Bellio

(10) Patent No.: US 10,675,784 B2
(45) Date of Patent: Jun. 9, 2020

(54) METHOD AND SYSTEM OF CONTROLLING A PLANT FOR DEHUMIDIFYING AND/OR DRYING

(71) Applicant: PIOVAN S.p.A., Santa Maria di Sala (Venice) (IT)

(72) Inventor: Enrico Bellio, Ponzano V.to (IT)

(73) Assignee: Piovan S.p.A., Santa Maria di Sala (IT)

( * ) Notice: Subject to any disclaimer, the term of this patent is extended or adjusted under 35 U.S.C. 154(b) by 0 days.

(21) Appl. No.: 16/062,803

(22) PCT Filed: Dec. 2, 2016

(86) PCT No.: PCT/IB2016/057312
§ 371 (c)(1),
(2) Date: Jun. 15, 2018

(87) PCT Pub. No.: WO2017/103721
PCT Pub. Date: Jun. 22, 2017

(65) Prior Publication Data
US 2019/0344478 A1 Nov. 14, 2019

(30) Foreign Application Priority Data
Dec. 18, 2015 (IT) .................. 102015000084811

(51) Int. Cl.
*B29B 13/06* (2006.01)
*F26B 17/12* (2006.01)
(Continued)

(52) U.S. Cl.
CPC ............ *B29B 13/065* (2013.01); *B29C 45/76* (2013.01); *F26B 9/06* (2013.01); *F26B 17/12* (2013.01);
(Continued)

(58) Field of Classification Search
CPC .................. B29B 13/065; B29C 45/76; B29C 2945/76006; B29C 2945/7618;
(Continued)

(56) References Cited

U.S. PATENT DOCUMENTS 5,424,013 A * 6/1995 Lieberman .......... B29B 17/0026
264/40.1
8,793,900 B2 * 8/2014 Moretto ................ B29B 13/065
34/137

(Continued)

FOREIGN PATENT DOCUMENTS

EP 2186613 A1 5/2010

OTHER PUBLICATIONS

International Search Report and Written Opinion of the International Searching Authority, Application No. PCT/IB2016/057312, completed: Feb. 6, 2017; dated Feb. 13, 2017, 11 pages.

*Primary Examiner* — Matthew J Daniels
*Assistant Examiner* — Yunju Kim
(74) *Attorney, Agent, or Firm* — Whitmyer IP Group LLC

(57) ABSTRACT

A method is disclosed of controlling a plant for dehumidifying and/or drying plastic material in granular and/or micro-granular and/or powder and/or flake or similar form, this plant including a process fluid generator and at least one dehumidifying/drying hopper for feeding a respective user machine associated with the plant and including a melting device for melting the plastic material and a moulding device for moulding, in particular by injection moulding and/or blow moulding and/or compression moulding, the plastic material. The method of controlling includes the steps of detecting in the user machine a pressure ($P_{pwp}$) of the plastic material in melted state and modifying at least one process parameter ($D_p$) of the plant on the basis of the detected value of this pressure ($P_{pwp}$).

19 Claims, 6 Drawing Sheets

(51) Int. Cl.
*F26B 9/06* (2006.01)
*B29C 45/76* (2006.01)
*F26B 21/08* (2006.01)
*F26B 21/12* (2006.01)

(52) U.S. Cl.
CPC .............. *B29C 2945/76006* (2013.01); *B29C 2945/7618* (2013.01); *B29C 2945/76381* (2013.01); *B29C 2945/76625* (2013.01); *B29C 2945/76809* (2013.01); *B29C 2945/76832* (2013.01)

(58) Field of Classification Search
CPC .. B29C 2945/7681; B29C 2945/76625; B29C 2945/76809; B29C 2945/76832; B29C 48/793; B29C 48/288; B29C 47/88; F26B 9/06; F26B 17/12
USPC .................................. 264/40.1, 40.6; 34/381
See application file for complete search history.

(56) References Cited

U.S. PATENT DOCUMENTS

2006/0168843 A1  8/2006  Zlotos
2010/0295199 A1  11/2010 Zhang et al.

\* cited by examiner

METHOD AND SYSTEM OF CONTROLLING A PLANT FOR DEHUMIDIFYING AND/OR DRYING

TECHNICAL FIELD

The invention relates to a method and a system of controlling a plant for dehumidifying and/or drying.

BACKGROUND

More precisely, the invention relates to a method and a system of controlling a plant for dehumidifying and/or drying plastic materials in granular and/or micro-granular and/or powder and/or flake or similar form, intended for feeding user machines associated with such a plant, in particular machines for treating and transforming plastic materials, such as machines for extruding, and subsequently injection moulding and/or blow moulding and/or compression moulding the plastic materials.

It is known, in the plastic materials moulding field, to associate a plant for dehumidifying and/or drying with at least one user machine, for example an injection moulding machine, for treating i.e. dehumidifying and/or drying, by a process fluid, the plastic material, before the latter is fed to the, at least one, user machine.

The latter generally comprises:

a melting device, also known as an extruder, for melting the plastic material, which includes, for example, an electrically heated extrusion cylinder and an extruding/plastifying screw that is rotatably movable in the cylinder;

a moulding device, in flow communication with the extruding cylinder, for moulding, for example by injection moulding and/or blow moulding and/or compression moulding, the plastic material in melted state; and a control and management unit.

This user machine can, optionally, also be provided with a pressure transducer configured to detect an injection pressure value of the plastic material in melted state exiting the extruding cylinder of the melting device, i.e. entering the moulding device.

Plants for dehumidifying and/or drying plastic materials, in particular in granular form, associated with the, at least one, user machine disclosed above, generally comprise:

a generator of process fluid, typically air; and at least one dehumidifying/drying hopper, intended for containing the plastic material in granular form and feeding a respective user machine.

The generator of process fluid, also known as a "dryer", dehumidifies, heats, and delivers, a defined flow rate of process fluid in the at least one dehumidifying/drying hopper so as to treat the plastic material before the plastic material is fed to the, at least one, user machine.

In use, it may happen that the pressure detected by the pressure measurer and registered by the control and management unit during a moulding cycle falls below or rises above a preset nominal limit value, which could compromise the mechanical and/or electrical and/or chemical-physical and/or optical properties of the finished product.

For example, in the case of injection moulding machines for moulding preforms made of polyethylene terephthalate (PET), a detected pressure that is greatly below the nominal limit value may indicate a degraded melted plastic material, whilst a detected pressure that is greater than the nominal limit value may indicate high viscosity of the melted plastic material or a difficulty of the melted plastic material in reaching the moulding device, for example because of conduits that are too narrow or are blocked.

When the pressure detected by the pressure transducer falls below, or rises above, the preset nominal limit value, the control and management unit that controls the user machine, if suitably configured and enabled, can stop the user machine and thus interrupt production of the finished product.

As such user machines are not generally manned by an operator, at night it may occur that nobody realizes this or much time elapses before an operator intervenes.

Once the operator becomes aware of the stop of the user machine, the operator, in order to try to restore the correct injection pressure, acts on the user machine, for example by:

acting on the user machine cycle times, for example by acting on the loading time of the plastic material into the melting device (i.e. into the extrusion cylinder containing the extruding/plastifying screw); and/or acting on the injection time and/or injection speed or transfer speed of the melted plastic material; and/or acting on the plastifying temperature of the melted plastic material; and/or acting on the compacting and/or maintenance time of the melted plastic material; and/or acting on the pressure limits of the melting device; and/or increasing the driving torque or the number of revolutions, of the extruding screw; and/or acting on a historical basis of preceding episodes or according to the know-how of the company that manufactures/uses the user machine.

A drawback of this intervention method is that it entails lengthy downtime of the user machine, with consequent increase in costs due to production loss, and, before the user machine is stopped, manufacture of numerous reject products.

A further drawback of this method of intervention is that it is anyway ineffective if the plastic material provided by the plant for dehumidifying and/or drying is of low quality, for example because of the presence of humidity in the mass of the plastic material, in particular in the mass of granules. In this case, the operator can choose between two alternatives: making the user machine process all the low quality material, which is still present in the hopper, with certain rejection of the final products obtained from this material; or interrupting production, i.e. maintaining the user machine stationary and waiting for the plant for dehumidifying and/or drying to change the process conditions (so as to improve the quality of the plastic material supplied to the user machine), with a significant increase in the costs linked to the interruption of production.

SUMMARY

An object of the present invention is to improve the methods and systems of controlling of a plant for dehumidifying and/or drying plastic material in granular and/or micro-granular and/or powder and/or flake or similar form, intended for feeding user machines associated with such a plant, in particular machines for treating and transforming plastic materials, such as machines for extruding, and subsequently injection moulding and/or blow moulding and/or compression moulding the plastic materials.

A further object is to provide a method and a system of controlling a plant for dehumidifying and/or drying plastic materials that enable downtime to be reduced or even eliminated of the user machine/s associated with the plant for dehumidifying and/or drying.

Such objects and still others are achieved by a method and a system of controlling a plant for dehumidifying and/or drying plastic materials according to the invention.

BRIEF DESCRIPTION OF THE DRAWINGS

The invention can be better understood and implemented with reference to the attached drawings that illustrate some embodiments thereof by way of non-limiting example, in which.

DETAILED DESCRIPTION

The present invention is advantageously applied to a method and to a system 1 of controlling a plant 2 for dehumidifying and/or drying plastic material in granular and/or micro-granular and/or powder and/or flake or similar form, for example polyethylene terephthalate (PET), intended for supplying at least one user machine 3 associated with such a plant, in particular a machine for treating and transforming a plastic material.

The following disclosure will refer explicitly to this advantageous application without thereby losing generality.

Figure 1:
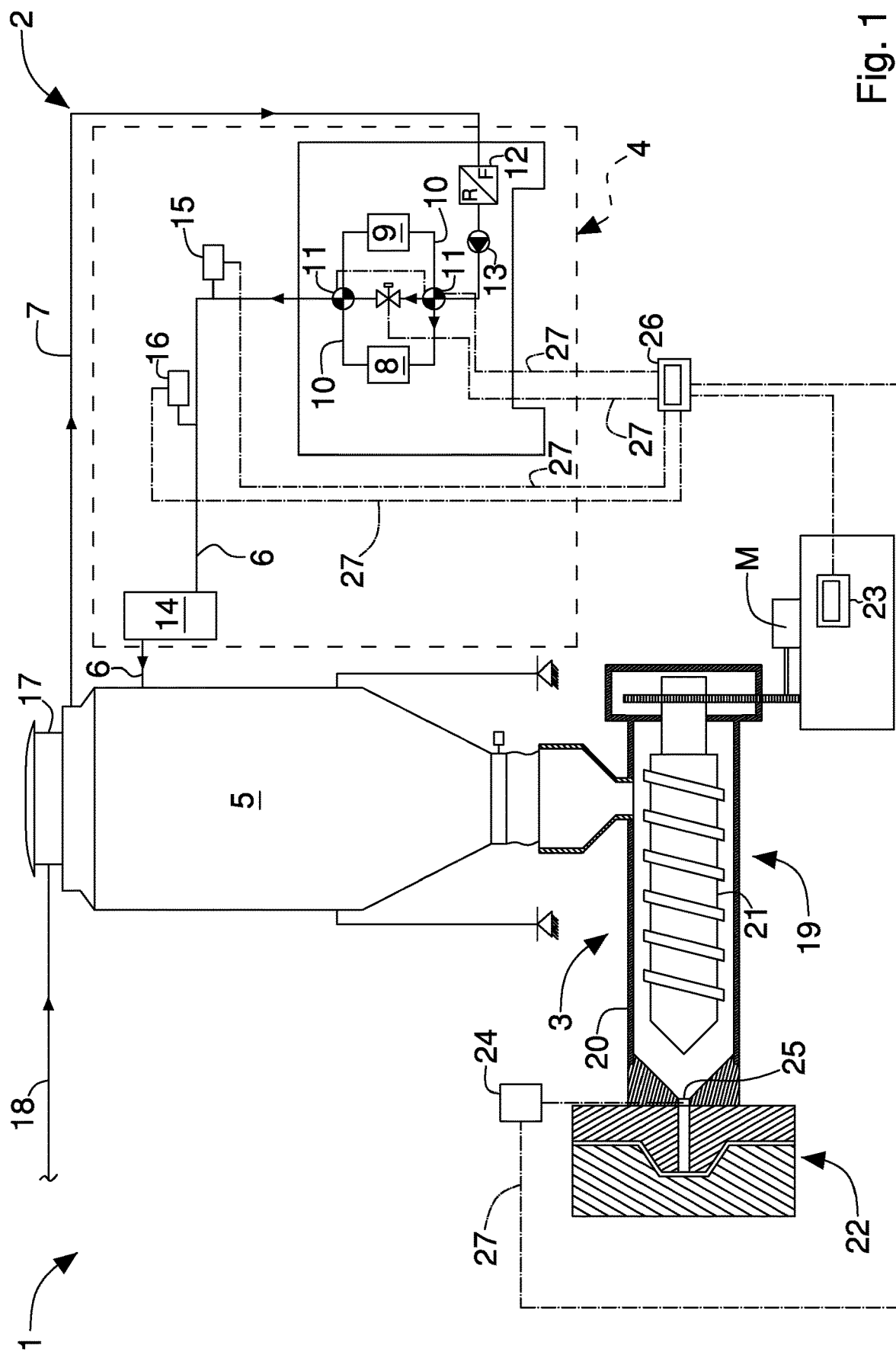
FIG. 1 is a partially sectioned schematic view of a system of controlling a plant for dehumidifying and/or drying plastic materials according to a first embodiment of the invention.

With reference to FIG. 1 there is illustrated a first embodiment of the control system 1 according to the invention.

The dehumidifying and/or drying plant 2, controlled by the control system 1, comprises a process fluid generator 4, in particular air, the main components of which are bounded by a dotted line, and at least one dehumidifying/drying hopper 5.

The generator 4, also known as a "dryer", dehumidifies, heats, and delivers, by a first conduit 6, a defined flow rate of process fluid into the hopper 5, and, by a second conduit 7, receives the used process fluid into the hopper 5 to dehumidify and/or dry the plastic material.

In particular, the process fluid generator 4 comprises a pair of towers 8, 9 for regenerating the process fluid that are connected together by conduits 10, between the regenerating towers 8, 9 valves 11 being provided that are intended to activate selectively one of the two regenerating towers 8, 9.

The process fluid generator 4 further comprises a filter/cooler 12 for filtering/cooling the process fluid, and a pump 13, that works in a closed circuit, to pump the process fluid into the hopper 5.

Also, the generator 4 comprises a heating chamber 14 to heat the process fluid to be sent into the hopper 5. The heating chamber 14 can, for example, be switched on or off by a PID (proportional-integral-derivative) control.

The system 1 comprises, along the first conduit 6, a measurer 15 of the value of the dew point $D_p$, of the process fluid, and a measurer 16 of the flow rate of the process fluid.

The aforesaid hopper 5 is fed, with plastic material, by a receiver 17 of plastic material, the latter being supplied to the receiver 17 by a feeding conduit 18.

The hopper 5 is intended for feeding the plastic material to the user machine 3, for example a machine for treating and transforming plastic material, such as a machine for extruding, and subsequently moulding by injection moulding and/or blow moulding and/or compression moulding, the plastic material.

The user machine 3, for example an injection moulding machine, comprises a melting device 19, or extruder, for melting the plastic material, which includes, for example, an electrically heatable extruding/plastifying cylinder 20 and an extruding/plastifying endless screw 21, for example with a variable profile and section, which is rotatable in the cylinder 20 by a motor M, and a moulding device 22, in flow communication with the cylinder 20, for moulding, for example by injection moulding and/or blow moulding and/or compression moulding, the plastic material in melted state, in which the extruding/plastifying screw 21 transfers the plastic material in melted state from the extruding cylinder 20 to the moulding device 22.

Also, the user machine 3 comprises a control and management unit 23 that controls the user machine 3.

The system 1 comprises, between the melting device 19 and the moulding device 22, a pressure measurer 24 for measuring directly an injection pressure $P_{pwp}$ of the plastic material in melted state entering the moulding device 22.

In the present context, "injection pressure $P_{pwp}$" is the pressure at which the plastic material in melted state exits the melting device 19.

The aforesaid pressure measurer 24 is positioned substantially at a feeding zone 25 of the melting device 19 through which the melting device 19 feeds the plastic material in melted state to the moulding device 22.

Also, the system 1 comprises a control and management unit 26 connected, by respective communication lines 27 (illustrated by a dashed and dotted line), to the measurers 15, 16, 24 and to the control and management unit 23 of the user machine 3.

In use, as will be explained better in the following description of the operating method, the control and management unit 26 receives a signal, detected by the pressure measurer 24, corresponding to a detected injection pressure $P_{pwp}$ value of the plastic material in melted state, verifies whether the detected injection pressure $P_{pwp}$ value is greater than a preset limit value $P_{lim}$ of the injection pressure $P_{pwp}$ and sends suitable command signals to the process fluid generator 4 to modify, if the detected the injection pressure $P_{pwp}$ value is less than the or the same as the preset limit value $P_{lim}$, at least one process parameter of the plant 2.

Figure 6:
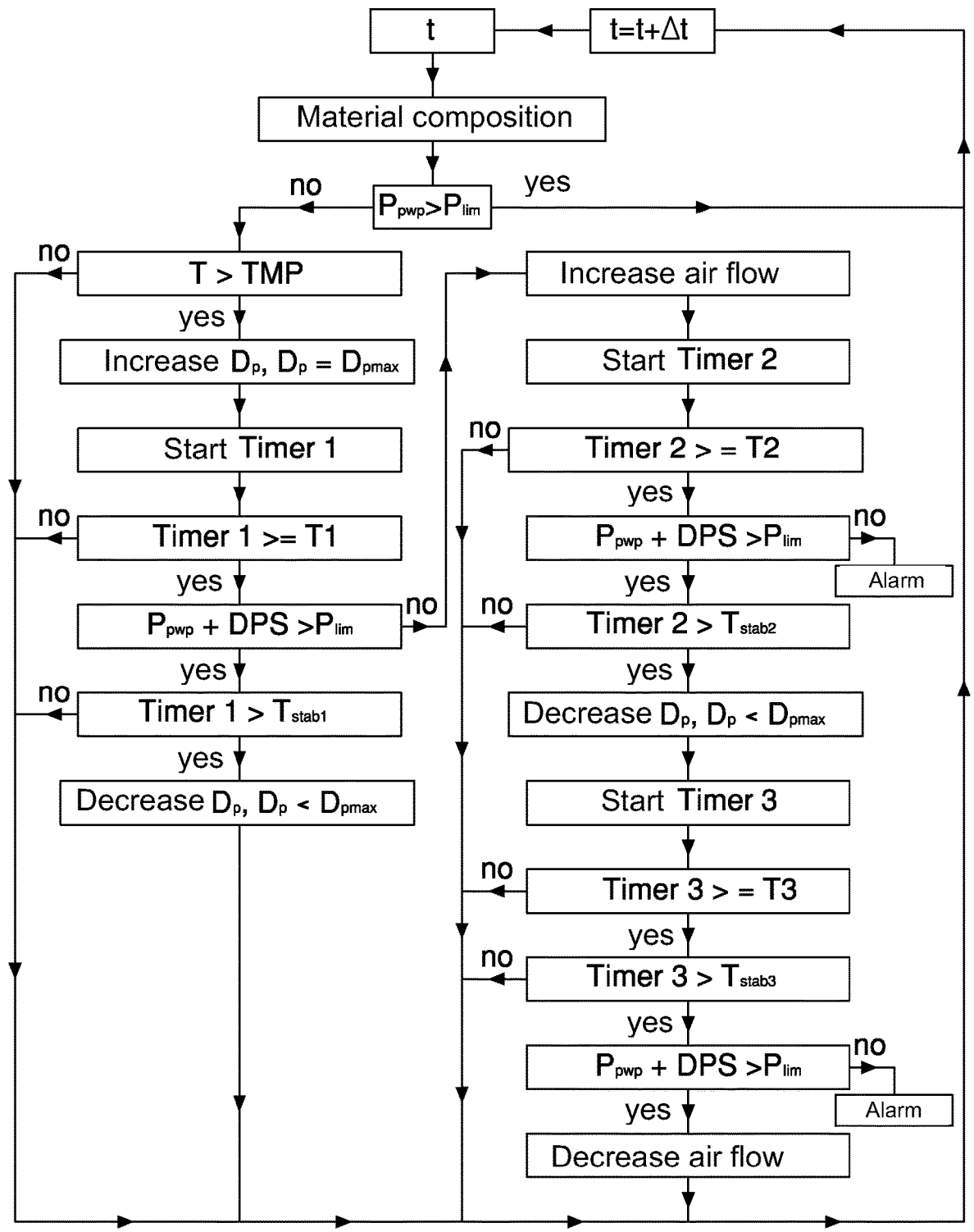
FIG. 6 is a block diagram of a method of controlling a plant for dehumidifying and/or drying plastic materials according to the invention.

The method according to the invention is disclosed below with reference to the block diagram illustrated in FIG. 6.

Initially, the method verifies whether the plastic material present in the hopper consists of virgin resin, or of a mixture of virgin resin and recycled material.

Subsequently, for each instant of time t, the measurer 24 detects, in the user machine 3, an injection pressure $P_{pwp}$ value of the melted plastic material. The injection pressure $P_{pwp}$ of the melted plastic material, measured continuously before the material enters the moulding device 22, as disclosed better below, enables maintenance operations to be anticipated on the dehumidifying and/or drying plant 2 and, at the same time, possible downtime of the user machine 3 and product rejects from the latter to be reduced.

Also subsequently, the detected injection pressure $P_{pwp}$ value is compared, by the control and management unit 26, with a preset limit value $P_{lim}$ of the injection pressure $P_{pwp}$ to verify whether the detected injection pressure $P_{pwp}$ value is greater than the limit value $P_{lim}$.

The limit value $P_{lim}$ is a settable value that varies according to the type of user machine 3.

If the detected injection pressure $P_{pwp}$ value is greater than the preset limit value $P_{lim}$, this means that the dehumidification and/or drying process is under control, i.e. that the plant 2 is supplying to the user machine 3 a suitably dehumidified and/or dried plastic material that is such that the finished product can meet the required quality standards. Further, the fact that the detected injection pressure $P_{pwp}$ value is greater than the preset limit value $P_{lim}$ enables it to be affirmed that the dehumidifying and/or drying plant 2 does not require, in the immediate future, extraordinary maintenance interventions. After which, the method again detects the injection pressure $P_{pwp}$ value at a subsequent instant of time t+Δt and again compares the injection pressure $P_{pwp}$ value with the preset limit value $P_{lim}$.

Vice versa, if the detected injection pressure $P_{pwp}$ value is less than or the same as the preset limit value $P_{lim}$ of the injection pressure $P_{pwp}$, i.e. the injection pressure $P_{pwp}$ is decreasing, this may mean that the dehumidifying and/or drying process is losing effectiveness, or that one or more of the components of the dehumidifying and/or drying plant 2 needs to undergo maintenance.

At this point, the method of controlling according to the invention allows a preset first time TMP, for example 4 hours, to elapse, during which amount of time TMP the detected injection pressure $P_{pwp}$ value is compared continuously with the preset limit value $P_{lim}$ of the injection pressure $P_{pwp}$. This initial time TMP is allowed to elapse to avoid interventions if the decrease in injection pressure $P_{pwp}$ is due to an instantaneous problem, due for example to a loss of power of the user machine 3, or to the fact that the cylinder 20 has not filled correctly, etc.

After the first time TMP has elapsed, if the detected injection pressure $P_{pwp}$ value is still less than or the same as the preset limit value $P_{lim}$ of the injection pressure $P_{pwp}$, i.e. the injection pressure $P_{pwp}$ still tends to decrease, the method modifies at least one process parameter of the dehumidifying and/or drying plant 2.

In particular, the method increases, by the control and management unit 26, a current value of the dew point $D_P$ of the process fluid, in particular increases the current value of the dew point $D_P$ of the process fluid to a maximum value $D_{pmax}$ of the dew point of the process fluid obtainable from the process fluid generator 4.

In other words, in this step the method disables, by the control and management unit 26, a stabilising function with which the control system 1 can be provided, this stabilising function having the task of maintaining stable, at a preset value, the value of the dew point $D_P$ of the process fluid supplied by the process fluid generator 4.

In particular, in order to rapidly increase the value of the dew point $D_P$ of the process fluid, the control and management unit 26 forces, by the valves 11, the change between the tower 8, 9 that is currently in use and the tower 8, 9 that is regenerated and waiting to be used, the latter being able to make the process fluid reach the maximum value of the dew point $D_{pmax}$.

This enables the plastic material present in the hopper 5 to be dehumidified, the viscosity of the plastic material to be increased, and thus the injection pressure $P_{pwp}$ to be increased.

After this, the method of controlling according to the invention allows a preset second time T1 to elapse, for example 3 hours, during which the detected injection pressure $P_{pwp}$ value is compared continuously with the preset limit value $P_{lim}$ of the injection pressure $P_{pwp}$ to verify whether the injection pressure $P_{pwp}$ is tending to decrease, has stabilised or is tending to increase.

After the second time T1 has elapsed, the method verifies, by the control and management unit 26, whether the detected injection pressure $P_{pwp}$ value, optionally increased by a DPS safety factor (so as to take account of possible "swings" of the injection pressure $P_{pwp}$), is greater than the preset limit value $P_{lim}$ of the injection pressure $P_{pwp}$.

If the detected injection pressure $P_{pwp}$ value, optionally increased by the DPS safety factor, is greater than the preset limit value $P_{lim}$ of the injection pressure $P_{pwp}$, the method of controlling, by the control and management unit 26, allows a preset third time $T_{stab1}$ to elapse, during which the detected injection pressure $P_{pwp}$ value, optionally increased by the DPS safety factor, is compared continuously with the preset limit value $P_{lim}$ of the injection pressure $P_{pwp}$ to verify whether the injection pressure $P_{pwp}$ has stabilised.

After the third time $T_{stab1}$ has elapsed, the method decreases a current value of the dew point $D_P$ of the process fluid, i.e. restores the stabilising function of the control system 1. This means that the action of increasing the value of the dew point $D_P$ has had the effect of returning the injection pressure $P_{pwp}$ to a value above the limit value $P_{lim}$.

On the other hand, if the detected injection pressure $P_{pwp}$ value, optionally increased by the DPS safety factor, is less than or the same as the preset limit value $P_{lim}$ of the injection pressure $P_{pwp}$, the control method, by the control and management unit 26, drives the generator 4 so as to increase a current value of the flow rate of process fluid into the hopper 5, in particular to increase a ratio between the flow rate of the process fluid and the hourly production of the hopper 5, this ratio being defined, in the field, as the K factor, up to a preset value $K_{AIPC}$ that is a function of the plastic material and of the user machine 3.

In other words, in this step the method disables, by the control and management unit 26, an optimisation function with which the control system 1 can be provided, this optimisation function optimising the energy consumption of the plant 2.

In particular, in order to rapidly increase the value of the flow rate of process fluid into the hopper 5, i.e. the K factor, the control and management unit 26 increases the rotation speed of the pump 13 until the preset value $K_{AIPC}$ is reached.

This surplus of energy enables the plastic material present in the hopper 5 to be dehumidified further, the viscosity of the plastic material to be increased, and thus the injection pressure $P_{pwp}$ to be increased.

After this, the method of controlling according to the invention allows a preset fourth time T2, for example of 2-3 hours, to elapse during which the detected injection pressure $P_{pwp}$ value is compared continuously with the preset limit value $P_{lim}$ of the injection pressure $P_{pwp}$ to verify whether the injection pressure $P_{pwp}$ is tending to decrease, has stabilised, or is tending to increase.

After the fourth time T2 has elapsed, the method verifies, by the control and management unit 26, whether the detected injection pressure $P_{pwp}$ value, optionally increased by the DPS safety factor, is greater than the preset limit value $P_{lim}$ of the injection pressure $P_{pwp}$.

If the detected injection pressure $P_{pwp}$ value, optionally increased by the DPS safety factor, is less than or the same as the preset limit value $P_{lim}$ of the injection pressure $P_{pwp}$, the method of controlling emits a warning signal and/or stops the user machine 3.

Vice versa, if the detected injection pressure $P_{pwp}$ value, optionally increased by the DPS safety factor, is greater than the preset limit value $P_{lim}$ of the injection pressure $P_{pwp}$, the control method, by the control and management unit 26, allows a preset fifth time $T_{stab2}$ to elapse, during which the detected injection pressure $P_{pwp}$ value, optionally increased by the DPS safety factor, is compared continuously with the preset limit value $P_{lim}$ of the injection pressure $P_{pwp}$ to verify whether the injection pressure $P_{pwp}$ has stabilised.

After the fifth time $T_{stab2}$, has elapsed, the method decreases a current value of the dew point $D_p$ of the process fluid, i.e. restores the stabilising function of the process control system 1. This means that the actions of increasing the value of the dew point $D_p$ and the flow rate of the process fluid, i.e. of the K factor, have had the effect of returning the injection pressure $P_{pwp}$ to a value above the limit value $P_{lim}$.

After this, the method of controlling according to the invention allows a preset sixth time T3 to elapse, for example of 2-3 hours, during which the detected injection pressure $P_{pwp}$ value is compared continuously with the preset limit value $P_{lim}$ of the injection pressure $P_{pwp}$ to verify whether the injection pressure $P_{pwp}$ is tending to decrease, has stabilised, or is tending to increase.

After the sixth time T3 has elapsed, the method allows a preset further sixth time $T_{stab3}$, for example of 2-3 hours, to elapse, during which the detected injection pressure $P_{pwp}$ value is still compared continuously with the preset limit value $P_{lim}$ of the injection pressure $P_{pwp}$ to verify whether the injection pressure $P_{pwp}$ is tending to decrease, has stabilised, or is tending to increase.

These time windows enable the tendency to be verified over time of the injection pressure $P_{pwp}$ to decrease, stabilise or increase.

After the further sixth time $T_{stab3}$ has elapsed, the method verifies, by the control and management unit 26, whether the detected injection pressure $P_{pwp}$ value, optionally increased by the DPS safety factor, is greater than the preset limit value $P_{lim}$ of the injection pressure $P_{pwp}$.

If the detected injection pressure $P_{pwp}$ value, optionally increased by the DPS safety factor, is less than or the same as the preset limit value $P_{lim}$ of the injection pressure $P_{pwp}$, the method of controlling emits a warning signal and/or stops the user machine 3.

Vice versa, if the detected injection pressure $P_{pwp}$ value, optionally increased by the DPS safety factor, is greater than the preset limit value $P_{lim}$ of the injection pressure $P_{pwp}$, the control method, by the control and management unit 26, decreases the air flow rate of the process fluid, i.e. decreases the K factor with respect to the preset value $K_{AIPC}$, i.e. restores the optimisation function of the control system 1. This means that the actions of increasing the value of the dew point $D_p$ and the flow rate of the process fluid, i.e. of the K factor have the effect of returning the injection pressure $P_{pwp}$ to a value above the limit value $P_{lim}$.

Figure 2:
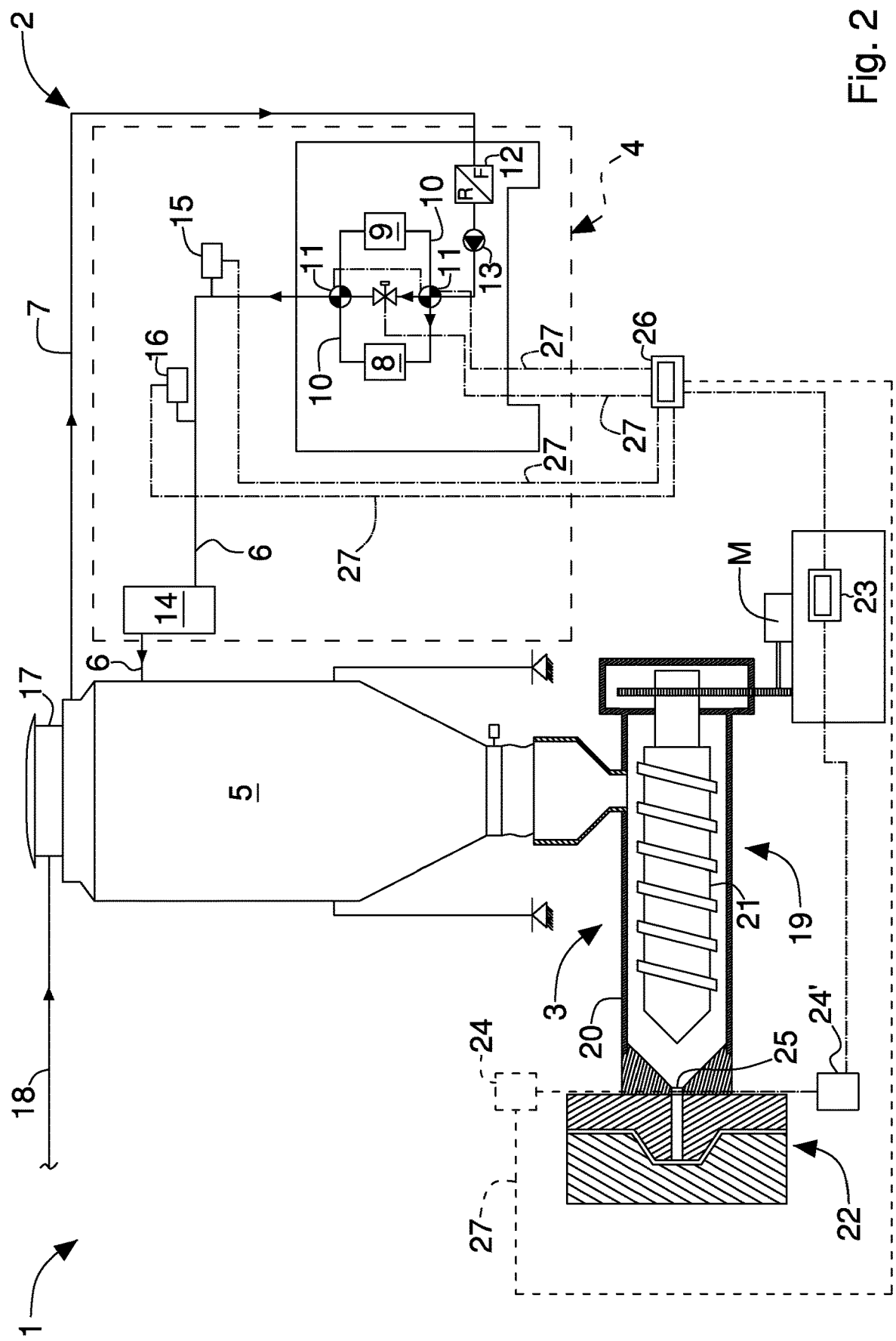
FIG. 2 is a partially sectioned schematic view, of a system of controlling a plant for dehumidifying and/or drying of plastic materials according to a second embodiment of the invention.

With reference to FIG. 2, a second embodiment is shown of the control system 1. This second embodiment differs from the embodiment illustrated in FIG. 1 by the fact that the user machine 3 is provided with a own measurer 24' of the injection pressure. In this embodiment, the pressure measurer 24, shown by a dashed line, is thus optional.

Figure 3:
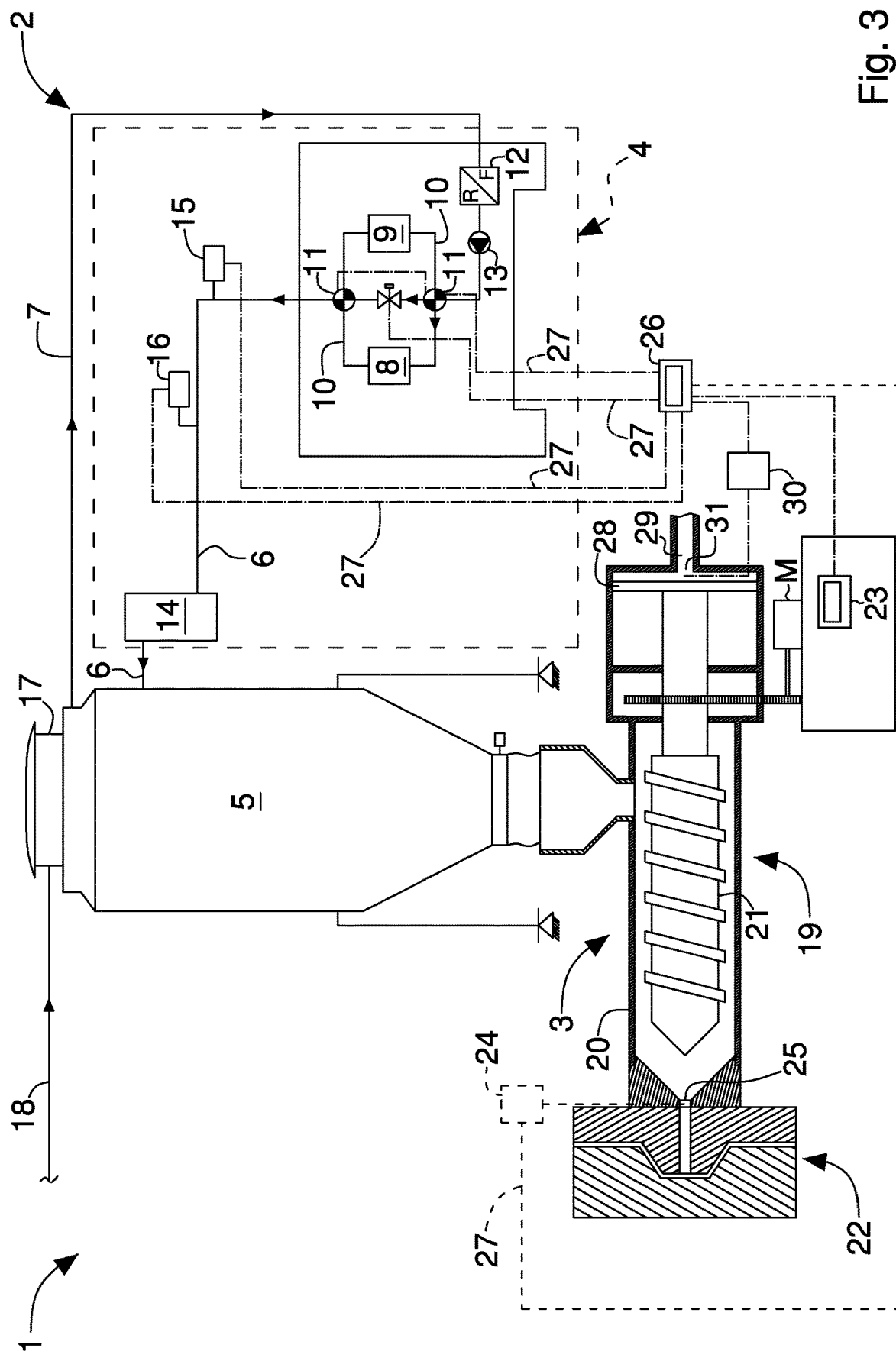
FIG. 3 is a partially sectioned schematic view, of a system of controlling a plant for dehumidifying and/or drying plastic materials according to a third embodiment of the invention.

With reference to FIG. 3, a third embodiment is shown of the control system 1. In this third embodiment the melting device 19 comprises, in addition to the extruding/plastifying cylinder 20 in flow communication with the moulding device 22 and to the extruding/plastifying screw 21 received in the extruding/plastifying cylinder 20 to transfer the plastic material in melted state from the extruding/plastifying cylinder 20 to the moulding device 22, a hydraulic piston 28 to axially drive the extruding/plastifying screw 21 in the extruding/plastifying cylinder 20, and a hydraulic circuit 29 for driving the piston 28 by a driving fluid, for example hydraulic oil. It should be noted that in the third embodiment the extruding screw 21 is rotated around its axis by a motor M, and is driven axially by the piston 28. Also, in the third embodiment, the user machine 3 comprises a measurer 30 of pressure positioned substantially at a feeding zone 31 of the hydraulic circuit 29 through which the hydraulic circuit 29 feeds the driving fluid to the piston 28. The measurer 30 measures the hydraulic pressure exerted on the piston 28 and sends a corresponding signal to the control and management unit 26. The latter, by suitable conversion factors, converts the hydraulic pressure detected by the measurer 30 into an injection pressure $P_{pwp}$ value of the plastic material in melted state entering the moulding device 22. In other words, in the third embodiment, the injection pressure $P_{pwp}$ of the plastic material in melted state is detected indirectly by converting, by the control and management unit 26, the hydraulic pressure detected by the measurer 30. Lastly, in the third embodiment, the pressure measurer 24, shown by a dashed line, is optional/alternative to the pressure measurer 30.

Figure 4:
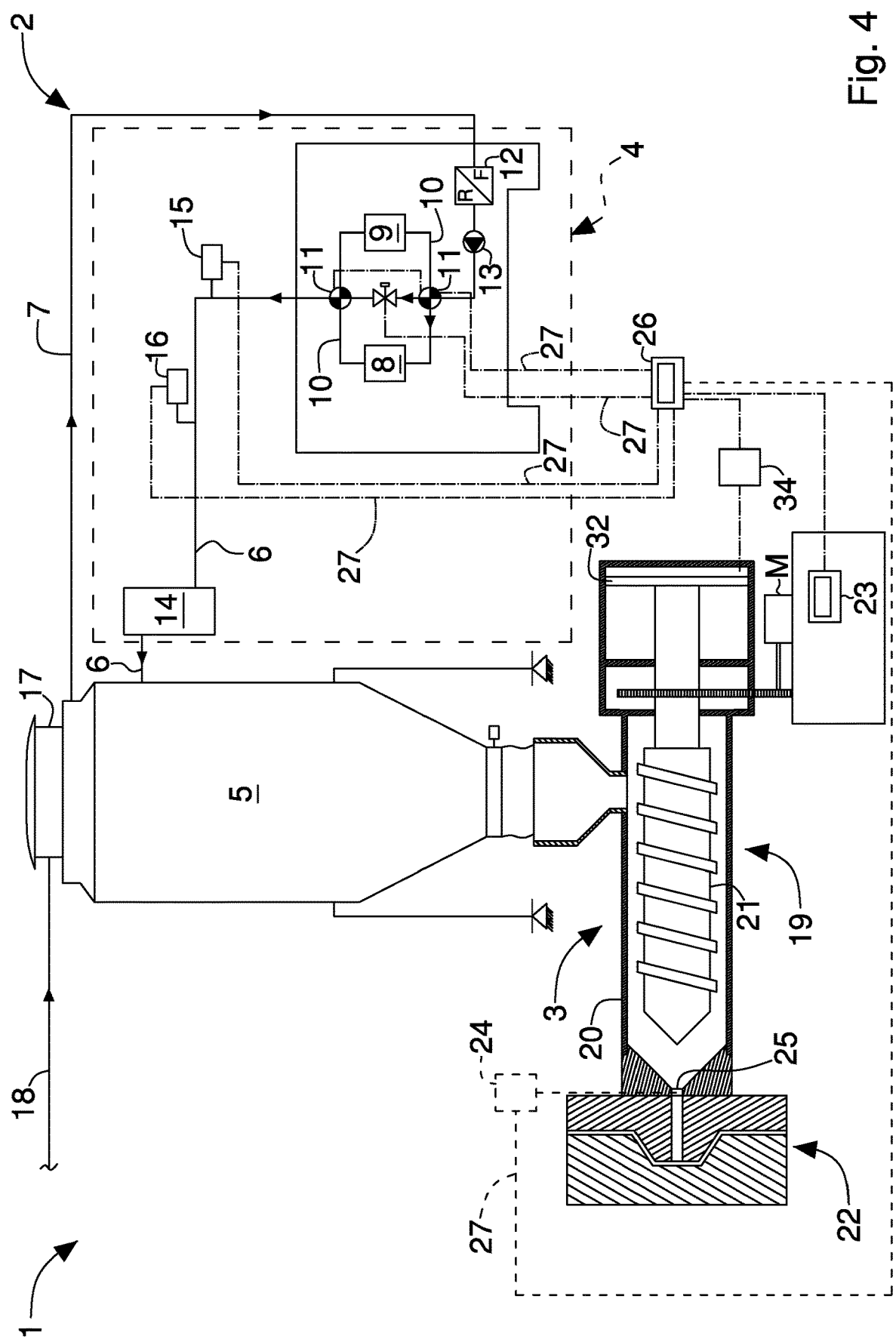
FIG. 4 is a partially sectioned schematic view of a system of controlling a plant for dehumidifying and/or drying plastic materials according to a fourth embodiment of the invention.

With reference to FIG. 4, a fourth embodiment is shown of the control system 1. In this fourth embodiment the melting device 19 comprises, in addition to the extruding/plastifying cylinder 20 in flow communication with the moulding device 22 and to the extruding/plastifying screw 21 received in the extruding/plastifying cylinder 20 to transfer the plastic material in melted state from the extruding/plastifying cylinder 20 to the moulding device 22, a piston 32 for driving axially the extruding/plastifying screw 21 in the extruding/plastifying cylinder 20, and electric driving means, not shown, for driving the piston 32. It should be noted that in the fourth embodiment the extruding/plastifying screw 21 is rotated around its axis by a motor M, and is driven axially by the piston 32. Also, in the fourth embodiment, the user machine 3 comprises a measurer 34, for example a load cell, positioned in such a manner as to measure a force, measurable in N (Newton), exerted by the piston 32 on the screw 21. In particular, the measurer 34 measures the thrust exerted by the piston 32 on the screw 21 and sends a corresponding signal to the control and management unit 26. The latter, by suitable conversion factors, converts the thrust detected by the measurer 34 into an injection pressure $P_{pwp}$ value of the plastic material in melted state entering the moulding device 22. In other words, in the fourth embodiment, the injection pressure $P_{pwp}$ of the plastic material in melted state is detected indirectly by converting, by the control and management unit 26, the thrust detected by the measurer 34. Lastly, in the fourth embodiment, the pressure measurer 24, shown by a dashed line, is optional/alternative to the measurer 34.

Figure 5:
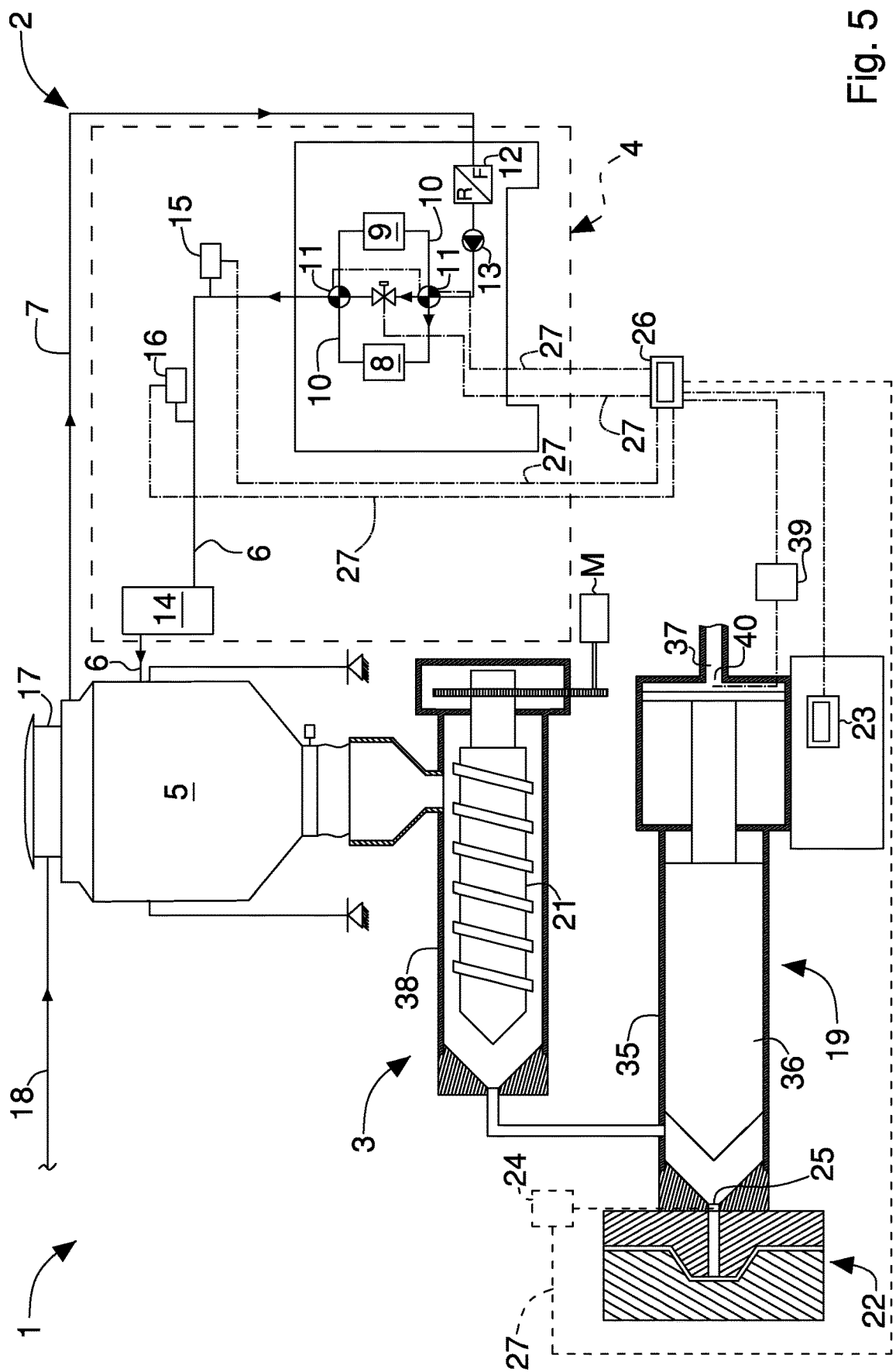
FIG. 5 is a partially sectioned schematic view, of a system of controlling a plant for dehumidifying and/or drying plastic materials according to a fifth embodiment of the invention.

With reference to FIG. 5, a fifth embodiment of the control system 1 is shown. In this fifth embodiment, the melting device 19 comprises an extruding/plastifying cylinder 38, an injection cylinder 35 in flow communication with the moulding device 22, an extruding piston 36 received and axially movable in the injection cylinder 35 to transfer the plastic material in melted state from the injection cylinder 35 to the moulding device 22, a hydraulic circuit 37 for driving the extruding piston 36 by a driving fluid, for example hydraulic oil, and an extruding/plastifying screw 21 received in the extruding/plastifying cylinder 38 to transfer the plastic material in melted state from the extruding/ plastifying cylinder 38 to the injection cylinder 35, in which the extruding/plastifying cylinder 38 is operationally positioned above, and in flow communication with, the injection cylinder 35. Also, in the fifth embodiment, the user machine 3 comprises a measurer 39 positioned substantially at a hydraulic circuit 37 feeding zone 40 through which the hydraulic circuit 37 feeds the driving fluid to the extruding piston 36. The measurer 39 measures the hydraulic pressure exerted on the extruding piston 36 and sends a corresponding signal to the control and management unit 26. The latter, by suitable conversion factors, converts the hydraulic pressure detected by the measurer 39 into an injection pressure $P_{pwp}$ value of the plastic material in melted state entering the moulding device 22. In other words, in the fifth embodiment, the injection pressure $P_{pwp}$ of the plastic material in melted state is detected indirectly by converting, by the control and management unit 26, the hydraulic pressure detected by the measurer 39. Lastly, in the fifth embodiment, the pressure measurer 24, shown by a dashed line, is optional/alternative to the pressure measurer 39.

It should be noted how the method and the system 1 according to the invention enable downtime of the user machines 3 associated with the dehumidifying and/or drying plant 2 to be reduced or even eliminated.

In fact, in the method according to the invention it is possible to counteract early, compared with known methods, injection pressure $P_{pwp}$, variation phenomena by acting on the dehumidifying and/or drying plant 2 and not, as is taught in the prior art, on the user machine/s 3.

Also, it should be noted how the actions of disabling the stabilisation and/or optimisation functions enable the correct injection pressure $P_{pwp}$ to be restored rapidly, greatly reducing, compared with the prior art, machine downtime and the production of rejects.

Also, it should be noted how continuous monitoring, i.e. monitoring in real time, of the injection pressure $P_{pwp}$ enables the dehumidification/drying process trend to be interpreted and possible maintenance on the dehumidifying and/or drying plant 2 to be anticipated compared with scheduled times. In fact, a tendency of the injection pressure $P_{pwp}$ to fall below the limit pressure $P_{lim}$, may mean a deterioration in the operating efficacy of the dehumidifying and/or drying plant 2 due to a deterioration and/or malfunction and/or breakage of one or more of the components thereof.

Also, it should be noted how the (if necessary) continuous modification of the process parameters of the dehumidifying and/or drying plant 2, carried out upstream of the user machine 3, and thus upstream of the finished product, i.e. on the melted plastic material, enables timely intervening to avoid variations in the quality of the finished product, with a consequent great reduction in the number of products to be rejected and thus sample checks of the finished product to be avoided, with consequent reduction of costs linked to personnel or devices intended for such checks.

In one version, the method according to the invention continuously monitors whether the injection pressure $P_{pwp}$ value is comprised between an upper limit value $P_{limsup}$ and a lower limit value $P_{liminf}$, i.e. between a band of values.

The invention claimed is:

1. A method of controlling a plant for dehumidifying and/or drying plastic material in granular and/or micro-granular and/or powder and/or flake form, said plant comprising a process fluid generator and at least one dehumidifying/drying hopper intended for feeding a respective user machine associated with said plant, the user machine for treating and transforming a plastic material, the user machine including a melting device for melting said plastic material and a moulding device for moulding, by injection moulding and/or blow moulding and/or compression moulding said plastic material the system includes a control and management unit configured for:

receiving a signal, detected by a measurer in said user machine, corresponding to a value of an injection pressure ($P_{pwp}$) of said plastic material in melted state;

verifying whether the detected value of said injection pressure ($P_{pwp}$) is greater than a preset limit value ($P_{lim}$) of said injection pressure ($P_{pwp}$); and sending command signals to said process fluid generator for adjusting, if said detected value of said injection pressure ($P_{pwp}$) is less than or the same as said preset limit value ($P_{lim}$), a process parameter of said plant;

the method of controlling includes the steps of:

detecting in said user machine the pressure ($P_{pwp}$) of said plastic material in melted state; and adjusting at least one process parameter ($D_p$) of said plant on the basis of the detected value of said pressure ($P_{pwp}$) using the control and management unit.

2. The method according to claim 1, wherein said pressure is the injection pressure ($P_{pwp}$) of said material in melted state in said moulding device.

3. The method according to claim 1, wherein said detecting includes detecting an injection pressure ($P_{pwp}$) of said material in melted state in said moulding device and is performed in a feeding zone of said melting device through which said melting device feeds said plastic material in melted state to said moulding device; and/or wherein said melting device includes an extruding/plastifying cylinder in flow communication with said moulding device, an extruding/plastifying screw received inside said extruding/plastifying cylinder to transfer said plastic material in melted state from said extruding/plastifying cylinder to said moulding device, a hydraulic piston for axially driving said extruding/plastifying screw inside said extruding/plastifying cylinder, and a hydraulic circuit for driving said piston by a driving fluid, wherein said detecting includes detecting a hydraulic pressure exerted on said hydraulic piston and is performed in a feeding zone of said hydraulic circuit through which said hydraulic circuit feeds said driving fluid to said piston; and/or wherein said melting device includes an extruding/plastifying cylinder in flow communication with said moulding device, an extruding/plastifying screw received inside said extruding/plastifying cylinder to transfer said plastic material in melted state from said extruding/plastifying cylinder to said moulding device, a piston for driving axially said extruding screw inside said extruding/plastifying cylinder, and electric driving means for driving said piston, wherein said detecting includes detecting a force exerted by said piston on said extruding/plastifying screw; and/or wherein said melting device includes an injecting cylinder in flow communication with said moulding device, an injecting piston received inside said injecting cylinder to transfer said plastic material in melted state from said injecting cylinder to said moulding device, a hydraulic circuit for driving said injecting piston by a driving fluid, an extruding/plastifying cylinder in flow communication with said injecting cylinder, and an extruding/plastifying screw received inside said extruding/plastifying cylinder to transfer said plastic material in melted state from said extruding/plastifying cylinder to said injecting cylinder, wherein said detecting includes detecting a hydraulic pressure exerted on said injecting piston and is performed in a feeding zone of said hydraulic circuit through which said hydraulic circuit feeds said driving fluid to said injecting piston.

4. The method according to claim 1, wherein said process parameter includes at least one between a value of the dew point ($D_P$) of said process fluid and a value of the flow rate of said process fluid into said hopper.

5. The method according to claim 1, wherein said detecting and said adjusting are conducted continuously.

6. The method according to claim 1, including, before said detecting, verifying whether said plastic material consists of virgin resin, or of a mixture of virgin resin and recycled material.

7. The method according to claim 2, including, after said detecting, verifying whether the detected value of said injection pressure ($P_{pwp}$) is greater than a preset limit value ($P_{lim}$) of said injection pressure ($P_{pwp}$).

8. The method according to claim 7, wherein if the detected value of said injection pressure ($P_{pwp}$) is greater than said preset limit value ($P_{lim}$) of said injection pressure ($P_{pwp}$), there is provided repeating in succession said detecting and said verifying in a subsequent instant of time; or wherein if the detected value of said injection pressure ($P_{pwp}$) is less than or the same as said preset limit value ($P_{lim}$) of said injection pressure ($P_{pwp}$) said adjusting includes:
letting a first preset time (TMP) elapse; and
decreasing a current value of the dew point ($D_P$) of said process fluid down to a minimum value ($D_{pmin}$) of the dew point of said process fluid that is obtainable by said fluid generator.

9. The method according to claim 8, wherein after said decreasing said value of the dew point ($D_P$) of said process fluid, said adjusting includes:
letting a second preset time (T1) elapse; and
verifying whether the detected value of said injection pressure ($P_{pwp}$), optionally increased by a safety factor (DPS), is greater than said preset limit value ($P_{lim}$) of said injection pressure ($P_{pwp}$).

10. The method according to claim 9, wherein if the detected value of said injection pressure ($P_{pwp}$), optionally increased by said safety factor (DPS), is greater than said preset limit value ($P_{lim}$) of said injection pressure ($P_{pwp}$) said adjusting includes letting a third preset time ($T_{stab1}$) elapse and increasing a current value of said dew point ($D_p$) of said process fluid; or wherein if the detected value of said injection pressure ($P_{pwp}$), optionally increased by said safety factor (DPS), is less than or the same as said preset limit value ($P_{lim}$) of said injection pressure ($P_{pwp}$), said adjusting includes increasing a current value of the flow rate of said process fluid into said hopper.

11. The method according to claim 10, wherein after said increasing said current value of the flow rate of said fluid into said hopper, there is provided:
letting a fourth preset time (T2) elapse; and
still verifying whether the detected value of said injection pressure ($P_{pwp}$) increased by said safety factor (DPS) is greater than said preset limit value ($P_{lim}$) of said injection pressure ($P_{pwp}$).

12. The method according to claim 11, wherein if the detected value of said injection pressure ($P_{pwp}$), optionally increased by said safety factor (DPS), is less than or the same as, said preset limit value ($P_{lim}$) of said injection pressure ($P_{pwp}$) there is provided emitting a warning signal and/or blocking said user machine; or wherein if the detected value of said injection pressure ($P_{pwp}$), optionally increased by said safety factor (DPS), is greater than said preset limit value ($P_{lim}$) of said injection pressure ($P_{pwp}$), said adjusting includes letting a fifth preset time($T_{stab2}$) elapse and increasing a current value of said dew point ($D_p$) of said process fluid.

13. The method according to claim 12, wherein after said increasing a current value of said dew point ($D_p$) of said process fluid there is provided letting a sixth preset time (T3, $T_{stab3}$) elapse and still verifying whether the detected value of said injection pressure ($P_{pwp}$), optionally increased by said safety factor (DPS), is greater than said preset limit value ($P_{lim}$) of said injection pressure ($P_{pwp}$).

14. The method according to claim 13, wherein if the detected value of said injection pressure ($P_{pwp}$), optionally increased by said safety factor (DPS), is less than or the same as, said preset limit value ($P_{lim}$) of said injection pressure ($P_{pwp}$) there is provided emitting a warning signal and/or blocking said user machine; or wherein if the detected value of said injection pressure ($P_{pwp}$), optionally increased by said safety factor (DPS), is greater than said preset limit value ($P_{lim}$) of said injection pressure ($P_{pwp}$), said adjusting includes decreasing a current value of said flow rate of process fluid into said hopper.

15. The method according to claim 2, wherein said detecting includes detecting an injection pressure ($P_{pwp}$) of said material in melted state in said moulding device and is performed in a feeding zone of said melting device through which said melting device feeds said plastic material in melted state to said moulding device; and/or wherein said melting device includes an extruding/plastifying cylinder in flow communication with said moulding device, an extruding/plastifying screw received inside said extruding/plastifying cylinder to transfer said plastic material in melted state from said extruding/plastifying cylinder to said moulding device, a hydraulic piston for axially driving said extruding/plastifying screw inside said extruding/plastifying cylinder, and a hydraulic circuit for driving said piston by a driving fluid, wherein said detecting includes detecting a hydraulic pressure exerted on said hydraulic piston and is performed in a feeding zone of said hydraulic circuit through which said hydraulic circuit feeds said driving fluid to said piston; and/or wherein said melting device includes an extruding/plastifying cylinder in flow communication with said moulding device, an extruding/plastifying screw received inside said extruding/plastifying cylinder to transfer said plastic material in melted state from said extruding/plastifying cylinder to said moulding device, a piston for driving axially said extruding screw inside said extruding/plastifying cylinder, and electric driving means for driving said piston, wherein said detecting includes detecting a force exerted by said piston on said extruding/plastifying screw; and/or wherein said melting device includes an injecting cylinder in flow communication with said moulding device, an injecting piston received inside said injecting cylinder to transfer said plastic material in melted state from said injecting cylinder to said moulding device, a hydraulic circuit for driving said injecting piston by a driving fluid, an extruding/plastifying cylinder in flow communication with said injecting cylinder, and an extruding/plastifying screw received inside said extruding/plastifying cylinder to transfer said plastic material in melted state from said extruding/plastifying cylinder to said injecting cylinder, wherein said detecting includes detecting a hydraulic pressure exerted on said injecting piston and is performed in a feeding zone of said hydraulic circuit through which said hydraulic circuit feeds said driving fluid to said injecting piston.

16. The method according to claim 2, wherein said process parameter includes at least one between a value of the dew point ($D_P$) of said process fluid and a value of the flow rate of said process fluid into said hopper.

17. The method according to claim 2, wherein said detecting and said adjusting are conducted continuously.

18. The method according to claim 2, including, before said detecting, verifying whether said plastic material consists of virgin resin, or of a mixture of virgin resin and recycled material.

19. A control system of a plant for dehumidifying and/or drying plastic material in granular and/or micro-granular and/or powder and/or flake or similar form, said plant including a process fluid generator and at least one dehumidifying/drying hopper intended for feeding a respective user machine associated with said plant, the user machine for treating and transforming a plastic material, the user machine for extruding and subsequently for injection moulding and/or blow moulding and/or compression moulding said plastic material; the system includes a control and management unit configured for:
   receiving a signal, detected by a measurer in said user machine, corresponding to a value of an injection pressure ($P_{pwp}$) of said plastic material in melted state;
   verifying whether the detected value of said injection pressure ($P_{pwp}$) is greater than a preset limit value ($P_{lim}$) of said injection pressure ($P_{pwp}$); and
   sending command signals to said process fluid generator for adjusting, if said detected value of said injection pressure ($P_{pwp}$) is less than or the same as said preset limit value ($P_{lim}$), a process parameter of said plant.

* * * * *